United States Patent
Kim et al.

(10) Patent No.: US 11,595,376 B2
(45) Date of Patent: Feb. 28, 2023

(54) SURVEILLANCE CAMERA SETTING METHOD, METHOD OF CONTROLLING AN INSTALLATION OF A SURVEILLANCE CAMERA AND SURVEILLANCE CAMERA SYSTEM

(71) Applicant: HANWHA TECHWIN CO., LTD., Seongnam-si (KR)

(72) Inventors: Hyun Ho Kim, Changwon-si (KR); Kyung Duk Kim, Changwon-si (KR); Min Jung Shim, Changwon-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 242 days.

(21) Appl. No.: 15/446,717

(22) Filed: Mar. 1, 2017

(65) Prior Publication Data
US 2018/0063120 A1 Mar. 1, 2018

(30) Foreign Application Priority Data
Aug. 25, 2016 (KR) ........................ 10-2016-0108382

(51) Int. Cl.
| | | |
|---|---|---|
| *G06F 16/84* | (2019.01) | |
| *H04N 7/18* | (2006.01) | |
| *H04W 12/77* | (2021.01) | |
| *H04W 12/69* | (2021.01) | |
| *G01S 19/13* | (2010.01) | |
| *G06K 7/14* | (2006.01) | |
| *H04L 67/141* | (2022.01) | |

(Continued)

(52) U.S. Cl.
CPC ............ *H04L 63/083* (2013.01); *G01S 19/13* (2013.01); *G06F 16/84* (2019.01); *G06K 7/1417* (2013.01); *H04L 67/141* (2013.01); *H04N 7/181* (2013.01); *H04W 12/69* (2021.01); *H04W 12/77* (2021.01); *G01S 19/42* (2013.01); *H04N 7/183* (2013.01)

(58) Field of Classification Search
CPC ..... G08B 13/1968; G01S 19/13; G01S 19/19; G06F 16/84; G06K 7/1417; H04L 63/083; H04L 67/141; H04N 7/181; H04N 7/183; H04W 12/69; H04W 12/77
See application file for complete search history.

(56) References Cited

U.S. PATENT DOCUMENTS

2008/0198159 A1* 8/2008 Liu .................. G08B 13/19686
345/420
2011/0317016 A1* 12/2011 Saeki ............... G08B 13/19613
348/154

(Continued)

FOREIGN PATENT DOCUMENTS

| KR | 10-1386591 | 4/2014 |
|---|---|---|
| KR | 10-2014-0109108 | 9/2014 |

(Continued)

*Primary Examiner* — Daniel B Potratz
*Assistant Examiner* — D'Arcy Winston Straub
(74) *Attorney, Agent, or Firm* — McLean IP Global; Jason Y. Pahng

(57) ABSTRACT

A method of setting a surveillance camera includes the steps of recognizing a readable object in an image captured by the surveillance camera, updating a set value of one or more set items of the surveillance camera associated with the readable object, and transmitting the set value of an at least one set item to an external device in response to receiving a request therefrom.

14 Claims, 8 Drawing Sheets

(51) Int. Cl.
    *G01S 19/42* (2010.01)
    *H04L 9/40* (2022.01)

(56) References Cited

U.S. PATENT DOCUMENTS

| | | | | |
|---|---|---|---|---|
| 2013/0120571 A1* | 5/2013 | Lee | ............ | H04N 7/18 |
| | | | | 348/143 |
| 2013/0169801 A1* | 7/2013 | Martin | ............... | H04N 5/23219 |
| | | | | 348/222.1 |
| 2016/0343137 A1* | 11/2016 | Skans | ................ | G06K 7/1095 |
| 2017/0200356 A1* | 7/2017 | Kim | ................ | H04N 5/23206 |
| 2017/0278365 A1* | 9/2017 | Madar | ................ | G06K 7/1417 |
| 2017/0278367 A1* | 9/2017 | Burke | ............. | G08B 13/19608 |
| 2018/0270763 A1* | 9/2018 | Lee | ........................ | G08B 25/08 |

FOREIGN PATENT DOCUMENTS

| KR | 10-2014-0124289 | | 10/2014 |
|---|---|---|---|
| KR | 20150074309 A | * | 7/2015 |
| KR | 10-2016-0054930 | | 5/2016 |

\* cited by examiner

FIG. 6

| Model | Description | IP Address | Port | ID | PW |
|---|---|---|---|---|---|
| X-604 | FIRST MAIN ROOM CAMERA | 192.168.10.10 | 80 | admin | ************ |
| X-604 | FIRST HALLWAY CAMERA | 192.168.10.11 | 80 | admin | ************ |
| X-604 | FIRST LIVING ROOM CAMERA | 192.168.10.12 | 80 | admin | ************ |
| X-609 | FIRST MULTIFUNCTIONAL CAMERA | 192.168.10.13 | 80 | admin | ************ |
| ... | ... | ... | ... | ... | ... |

61

SURVEILLANCE CAMERA SETTING METHOD, METHOD OF CONTROLLING AN INSTALLATION OF A SURVEILLANCE CAMERA AND SURVEILLANCE CAMERA SYSTEM

CROSS-REFERENCE TO RELATED APPLICATION

This application claims priority from and the benefit of Korean Patent Application No. 10-2016-0108382, filed on Aug. 25, 2016, which is hereby incorporated by reference for all purposes as if fully set forth herein.

BACKGROUND

Field

Exemplary embodiments relate to a surveillance camera setting method and a surveillance camera system.

Discussion of the Background

A surveillance camera system may include multiple surveillance cameras. To set specific set values for the surveillance cameras, users may generally have to set an access address for each of the surveillance cameras and access the surveillance cameras by using the set access addresses.

Such an installation method, however, may involve increased installation time with the increased number of surveillance cameras as well as increased time for maintenance thereof, as repeated checks on installation status and settings may be required for correct and exact installation.

The above information disclosed in this Background section is only for enhancement of understanding of the background of the inventive concept, and, therefore, it may contain information that does not form the prior art that is already known in this country to a person of ordinary skill in the art

SUMMARY

Exemplary embodiments include a surveillance camera setting method and a surveillance camera system that enable setting of surveillance cameras at the same time as the surveillance cameras are installed.

Exemplary embodiments also include a surveillance camera configured to update a set value or set values of one or more set items by reading an object included in an image and configured to transmit the set value or set values in response to a set value transmission request from an external device.

According to an exemplary embodiment, a method of setting a surveillance camera includes the steps of recognizing a readable object in an image captured by the surveillance camera, updating a set value of one or more set items of the surveillance camera associated with the readable object, and transmitting the set value of an at least one set item to an external device in response to receiving a request therefrom.

The set value of the readable object may be in a visually recognizable form.

The one or more set items may include at least one of an address of the surveillance camera in a network, an account for establishing connection to the surveillance camera from the at least one external device, a password for establishing connection to the surveillance camera from the at least one external device, and installation information on the surveillance camera.

The readable object may include a quick response (QR) code.

The method may further include the step of checking whether the surveillance camera satisfies a first condition, in which the step of recognizing the readable object is performed when the first condition is satisfied.

The first condition may be whether a time period from which the surveillance camera is powered on is within a first time range.

The first condition may be whether the set value of the one or more set items is initialized.

According to an exemplary embodiment, a method of controlling an installation of a surveillance camera includes the steps of detecting the surveillance camera connected to a network, generating mapping data of the detected surveillance camera, sending a request for a set value of one or more set items of the detected surveillance camera to the detected surveillance camera, receiving the set value from the detected surveillance camera, and updating the mapping data of the detected surveillance camera based on the received set value.

The one or more set items may include at least one of an address of the newly detected surveillance camera in the network, an account for establishing connection to the newly detected surveillance camera, a password for establishing connection to the newly detected surveillance camera, and installation information on the newly detected surveillance camera.

According to an exemplary embodiment, a surveillance camera system includes at least one surveillance camera configured to update a set value of one or more set items by reading a readable object in a captured image, and transmit the set value of the one or more set items to an external device in response to receiving a request for the set value therefrom, a user terminal configured to display the readable object on a display based on at least one of user's input and a surveillance camera database, and a surveillance camera management device configured to send the request for the set value of the one or more set items to the at least one surveillance camera, and update mapping data of the at least one surveillance camera by receiving the set value from the at least one surveillance camera.

The surveillance camera system may further include a network design device configured to set a connection relationship between the at least one surveillance camera and the network, and a set value of the at least one set item of the at least one surveillance camera according to a user's input.

The network design device may be configured to generate the surveillance camera database including the set value of the at least one set item of the at least one surveillance camera.

The user terminal may be configured to generate the readable object on the display based on at least one of the user's input and the surveillance camera database created by the network design device.

The installation information may include global positioning system (GPS) information with respect to a location of the at least one surveillance camera.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 6 is a table showing a database created by the network design device according to an exemplary embodiment.

DETAILED DESCRIPTION OF THE ILLUSTRATED EMBODIMENTS

Figure 1:
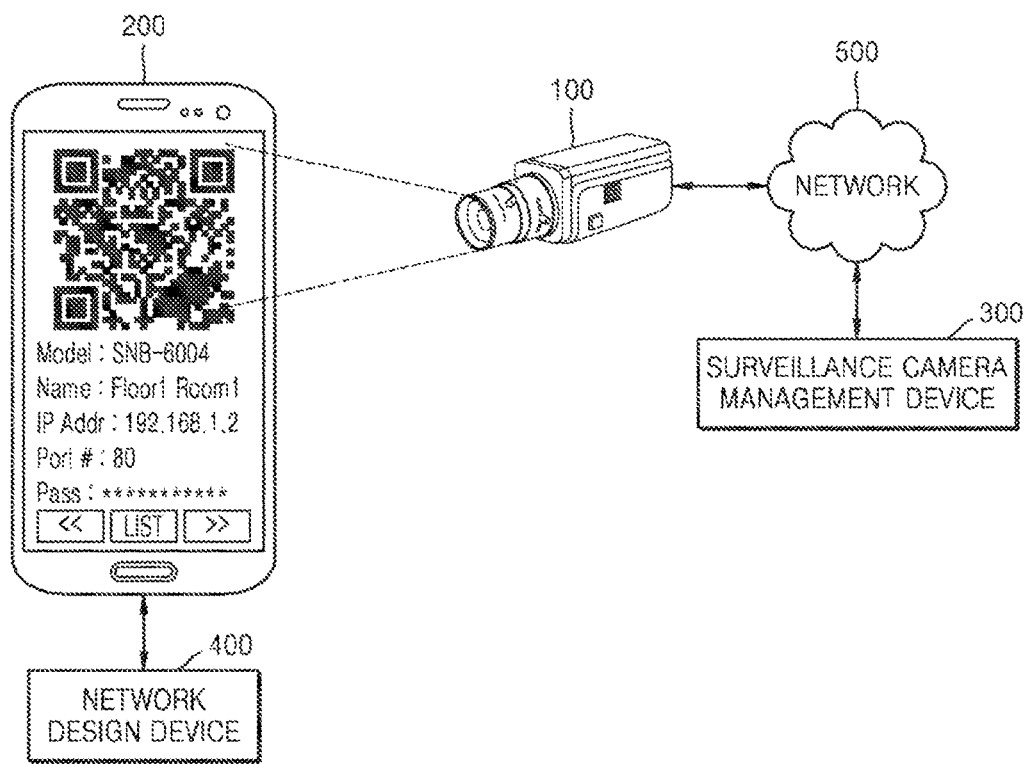
FIG. 1 is a schematic view illustrating a surveillance camera system according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the embodiments will be described in detail with reference to the accompanying drawings. In the drawings, like reference numerals denote like elements, and overlapping descriptions thereof will be omitted.

In the following descriptions of the embodiments, although the terms "first" and "second" are used to describe various elements, these elements should not be limited by these terms. These terms are only used to distinguish one element from another element. In the following descriptions of the embodiments, the terms of a singular form may include plural forms unless referred to the contrary. In the following descriptions of the embodiments, the meaning of "include," "comprise," "including," or "comprising" specifies a property, a region, a fixed number, a step, a process, an element, a component, and a combination thereof but does not exclude other properties, regions, fixed numbers, steps, processes, elements, components, and combinations thereof. In the drawings, the sizes of elements may be exaggerated for clarity. For example, in the drawings, the size or thickness of each element may be arbitrarily shown for illustrative purposes, and thus the inventive concept should not be construed as being limited thereto.

FIG. 1 is a schematic view illustrating a surveillance camera system according to an exemplary embodiment.

Referring to FIG. 1, the surveillance camera system according to an exemplary embodiment may include a surveillance camera 100, a user terminal 200, a surveillance camera management device 300, a network design device 400, and a network 500.

The user terminal 200 may display a readable object on a display of the user terminal 200 based on at least one of a user's input and a surveillance camera database. The surveillance camera database may be a database generated by the network design device 400, which will be described in more detail below.

The user terminal 200 may be, for example, a personal computer (PC) or a portable terminal. In FIG. 1, the user terminal 200 is shown as a portable terminal including a display, such as a smartphone. However, any device capable of displaying a readable object based on at least one of a user's input and a surveillance camera database may be used as the user terminal 200.

The surveillance camera management device 300 according to an exemplary embodiment may update mapping data of the surveillance camera 100 by requesting the surveillance camera 100 to send a set value or set values of one or more set items, and receiving the set value or set values of the one or more set items. Here, the mapping data may be a data structure containing information about the surveillance camera 100.

For example, the surveillance camera management device 300 may detect at least one surveillance camera connected to the network 500 and may create mapping data of the newly detected surveillance camera. As used herein, the "newly detected surveillance camera" may be a surveillance camera in which mapping data thereof is not stored in the surveillance camera management device 300, such as a surveillance camera newly connected to the network 500.

The surveillance camera management device 300 may request the newly detected surveillance camera to send a set value or set values of one or more set items of the newly detected surveillance camera. The surveillance camera management device 300 may then receive the set value or set values of the one or more set items sent from the newly detected surveillance camera, and may update the mapping data of the newly detected surveillance camera based on the received set value or set values. In this manner, the surveillance camera management device 300 according to an exemplary embodiment may obtain information about a surveillance camera connected to the network 500 and create and/or update mapping data of the surveillance camera.

The surveillance camera management device 300 may provide installation information of a newly detected surveillance camera to a user based on the updated mapping data, which will be described later in detail.

In addition to the above-described functions, the surveillance camera management device 300 may have other functions, such as a function of receiving captured images from the surveillance camera 100, a function of storing received images, and/or a function of providing stored images to a user in response to a user's request. The surveillance camera management device 300 may include, for example, one or more of a video management system (VMS), a content management system (CMS), a network video recorder (NVR), and a digital video recorder (DVR), to facilitate the above-described functions.

The network design device 400 according to an exemplary embodiment may set a network connection relationship for at least one surveillance camera according to a user's input. In addition, the network design device 400 may set a set value or set values of one or more set items of a surveillance camera according to a user's input.

According to an exemplary embodiment, the network design device 400 may perform the above-described setting operations before the surveillance camera system is installed. For example, a user may perform the above-described setting operations using the network design device 400 before the surveillance camera system is installed, so as to virtually configure the surveillance camera system in advance and check whether the surveillance camera system has errors, stability in operation, etc.

The network design device 400 may create a database including a set value of at least one of set items of a surveillance camera based on the above-described settings. The database generated may be provided to the user terminal 200, and a user may use the database when the user installs a surveillance camera using the user terminal 200. More particularly, when a user actually installs a surveillance camera, the user may update set values of the surveillance camera using a database, which is created based on connection settings and set items input into the network design device 400 during a system design stage.

The network 500 according to an exemplary embodiment may connect the surveillance camera 100 and the surveillance camera management device 300 to each other. For example, when the surveillance camera management device 300 requests the surveillance camera 100 to send a set value or set values of one or more set items, and the surveillance camera 100 sends the set value or set values of the one or more set items to the surveillance camera management device 300, the network 500 may provide a communication path between the surveillance camera management device 300 and the surveillance camera 100. Examples of the network 500 may include wired networks, such as local area networks (LANs), wide area networks (WANs), metropolitan area networks (MANs), and integrated service digital networks (ISDNs), and wireless networks, such as wireless LANs, code division multiple access (CDMA) networks, Bluetooth networks, and satellite communication networks.

The surveillance camera 100 according to an exemplary embodiment may recognize and/or read a readable object included in a captured image so as to update a set value or set values of one or more set items. In addition, the surveillance camera 100 may receive a request for a set value or set values of one or more set items from at least one external device, and may send the set value or set values of the one or more set items to the at least one external device upon receiving the request. Here, the external device may be the surveillance camera management device 300, for example.

Figure 2:
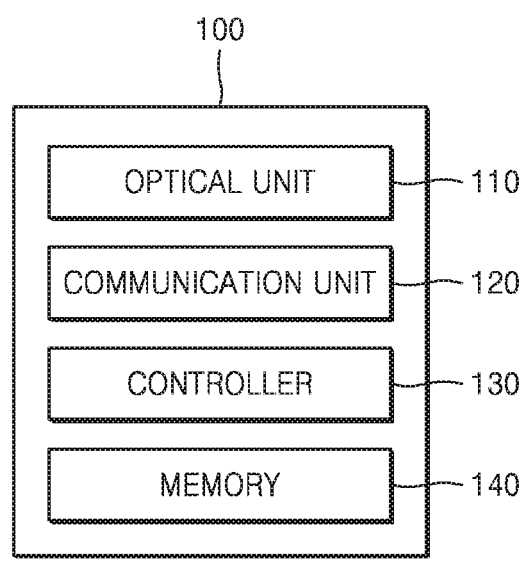
FIG. 2 is a schematic view illustrating a surveillance camera according to an exemplary embodiment.

FIG. 2 is a schematic view illustrating the surveillance camera 100 according to an exemplary embodiment.

Referring to FIG. 2, the surveillance camera 100 includes an optical unit 110, a communication unit 120, a controller 130, and a memory 140.

The optical unit 110 may include a lens and an image sensor, and may convert light into an electric signal. The optical unit 110 may include a lens group including at least one lens. The image sensor may convert images input through the lens into electric signals. For example, the image sensor may be a semiconductor device such as a charge-coupled device (CCD) or a complementary metal oxide semiconductor (CMOS) device capable of converting optical signals, such as images, into electric signals.

The communication unit 120 may include hardware or software, and may be connected to other network devices by a wired or wireless method in order to transmit or receive control signals or data signals.

The controller 130 may include any kind of devices, such as a processor, that may be capable of processing data. As used herein, the term "processor" may refer to a data processing device included in a hardware and having a physically structured circuit to execute codes of programs or functions expressed with instructions. Examples of the data processing device included in a hardware may include a microprocessor, a central processing unit (CPU), a processor core, a multiprocessor, an application-specific integrated circuit (ASIC), and a field programmable gate array (FPGA).

The memory 140 may temporarily or permanently store data, instructions, programs, program codes, or combinations thereof that the controller 130 processes. The memory 140 may include, for example, a magnetic storage medium and/or a flash storage medium. The memory 140 may temporarily or permanently store a set value or set values for one or more set items of the surveillance camera 100 in addition to data and instructions, and may also temporarily or permanently store images captured by the surveillance camera 100.

The controller 130 may determine whether the state of the surveillance camera 100 satisfies a particular condition, and may control the surveillance camera 100 to perform an object recognizing operation only when the state of the surveillance camera 100 satisfies the particular condition.

As used herein, the "particular condition" may be whether a time period from which the surveillance camera 100 has been powered on is within a preset critical time range. For example, the controller 130 may determine that the surveillance camera 100 satisfies the particular condition when the surveillance camera 100 has been powered on within the last 1000 seconds.

Alternatively, the "particular condition" may be a condition that all set values of one or more set items of the surveillance camera 100 have not been set or initialized. For example, if set values of all set items of the surveillance camera 100 are initialized into a non-set state using a reset button (not shown) of the surveillance camera 100, the controller 130 may determine that the surveillance camera 100 satisfies the particular condition.

Since the controller 130 performs an object recognizing operation only when the state of the surveillance camera 100 satisfies the particular condition, resources of the surveillance camera 100 may be used more effectively and malfunctioning of the surveillance camera 100 may be prevented.

The controller 130 may recognize a readable object included in an image captured by the surveillance camera 100. As used herein, the term "object" may refer to an object in which a set value or set values for one or more set items of the surveillance camera 100 are included in a visually recognizable form. For example, an object may be one of a quick response (QR) code or a bar code. It is contemplated that, however, any object having a shape, in which a set value or set values for one or more set items of the surveillance camera 100 are included in a visually recognizable form, may be used as the object. For example, an object may be a character string denoting a set value or set values for one or more set items of the surveillance camera 100.

As used herein, "one or more set items of the surveillance camera 100" may be an item or items determinable by user's setting, such as an address of the surveillance camera 100 in the network 500, an account for connecting to the surveillance camera 100 from an external device, a password for connecting to the surveillance camera 100 from an external device, a port for connecting to the surveillance camera 100 from an external device, and installation information on the surveillance camera 100. The installation information on the surveillance camera 100 may include text and/or image information about the installation location of the surveillance camera 100, global positioning system (GPS) information about the installation location of the surveillance camera 100, information about a byname of the surveillance camera 100, and other information by which a user may recognize the surveillance camera 100.

In addition, "one or more set items of the surveillance camera 100" may be an item or items that may not be set by a user, such as the model name or MAC address of the surveillance camera 100. It is contemplated that, however, any item denoting a property of the surveillance camera 100 may be a set item according to exemplary embodiments.

In addition, as used herein, the expression "recognizing a readable object included in an image" may be referred to as the controller 130 identifying a recognizable object in an image. For example, when an object is a QR code, the expression "recognizing a readable object included in an image" may refer that the controller 130 identifies the QR code in the image.

The controller 130 may read a recognized object and may update a set value or set values of one or more set items of the surveillance camera 100. As described above, according to an exemplary embodiment, an "object" may include a set value or set values for one or more set items of the surveillance camera 100 in a visually recognizable form, and thus, the controller 130 may obtain information about a set value or set values by reading the object.

For example, if an object is a QR code and set items of the surveillance camera 100 are an address of the surveillance camera 100 in the network 500 and an account for connecting to the surveillance camera 100 from an external device, the controller 130 may obtain set values such as an address "192.168.10.10" of the surveillance camera 100 in the network 500 and an account "admin" for establishing connection to the surveillance camera 100, and may update a set value or set values of one or more set items based on the obtained set values.

If an object is a QR code and a set item is a port for establishing connection to the surveillance camera 100 from an external device, the controller 130 may obtain a port number such as "80" by reading the QR code included in an image, and may update a port set value for port forwarding.

Since the surveillance camera 100 may photograph an object as described above, a user may rapidly and simply update set values of multiple set items of the surveillance camera 100.

The controller 130 may receive a request for a set value of at least one set item, among a set value or set values of one or more set items, from at least one external device. In addition, the controller 130 may send the set value of the at least one set item to the at least one external device in response to receiving the request for the set value received from the at least one external device.

For example, the controller 130 may receive a request from an external device such as the surveillance camera management device 300 for an address of the surveillance camera 100 in the network 500, an account for establishing connection to the surveillance camera 100 from the surveillance camera management device 300, a password for establishing connection to the surveillance camera 100 from the surveillance camera management device 300, and a set value for a set item of the surveillance camera 100. Then, the controller 130 may send set values for set items corresponding to the request to the surveillance camera management device 300.

In general, when a user installs a surveillance camera system, a user may typically have to carry out cumbersome procedures such as setting address of each surveillance camera and checking images sent from the respective surveillance cameras. Particularly, when multiple surveillance cameras of the same model are included in a surveillance camera system, it may be difficult to distinguish the surveillance cameras by using the model name alone, and thus, a user may have to perform several conformation procedures to distinguish between the surveillance cameras.

Furthermore, a conventional surveillance camera to be installed at a specific position may be previously designated, and after individually setting surveillance cameras according to installation positions, the designated surveillance camera may be installed at the specific position. However, a designated surveillance camera should be installed at a specific position according to conventional methods, and thus, it would take much time to arrange surveillance cameras and find the designated surveillance camera.

According to an exemplary embodiment, when a user installs surveillance cameras, the surveillance cameras may capture images of objects, by which set items of the surveillance cameras may be simply changed. In addition, the set items of the surveillance cameras may be precisely checked using an external device such as the surveillance camera management device 300. According to an exemplary embodiment, set items of surveillance cameras may be immediately changed while the surveillance cameras are installed, and thus, any one of the surveillance cameras may be installed at any position without positional limitations as long as the surveillance cameras are of the same model, thereby reducing time and costs associated with the installation process. Furthermore, according to an exemplary embodiment, after set items of surveillance cameras are once input into the network design device 400, individually inputting set items of the surveillance cameras may be obviated, and thus, the surveillance camera system may be effectively installed.

Figure 3:
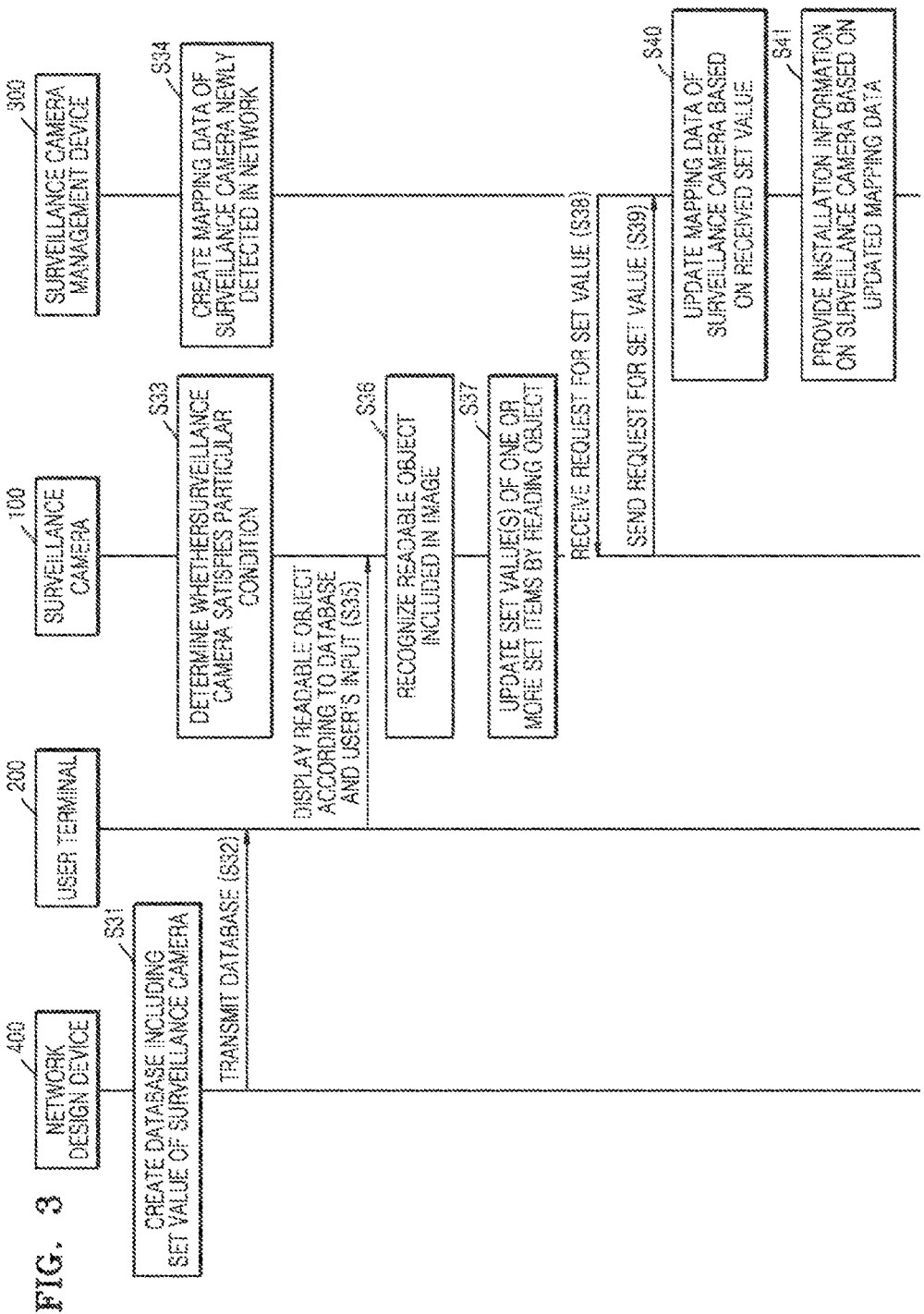
FIG. 3 is a flowchart illustrating a method of processing information between elements of the surveillance camera system according to an exemplary embodiment.

FIG. 3 is a flowchart illustrating a method of processing information between elements of the surveillance camera system according to an exemplary embodiment.

Referring to FIG. 3, the network design device 400 according to an exemplary embodiment may create a database including a set value of at least one of set items of at least one surveillance camera (S31). As described above, the network design device 400 may set a network connection relationship regarding at least one surveillance camera, and a set value or set values of one or more set items of the at least one surveillance camera according to a user's input. In addition, the network design device 400 may create a database including a set value of at least one of set items of the at least one surveillance camera based on the above-described settings.

The network design device 400 may transmit the database to the user terminal 200 (S32). In this case, the network design device 400 may send the database to the user terminal 200 using the network 500, another network (not shown), or any other communication method.

The surveillance camera 100 may determine whether the state of the surveillance camera 100 satisfies a particular condition (S33). The surveillance camera 100 may perform an object recognizing operation at step S36, only when the state of the surveillance camera 100 satisfies the particular condition at step S33.

As described above, the "particular condition" may be whether a time period from which the surveillance camera 100 is powered on is within a preset critical time range. For example, it may be determined that the surveillance camera 100 satisfies the particular condition when the surveillance camera 100 has been powered on within last 1000 seconds.

In addition, the "particular condition" may alternatively or additionally be a condition in which all set values of one or more set items of the surveillance camera 100 have not been set. For example, if set values of all set items of the surveillance camera 100 are initialized into a non-set state using the reset button (not shown) of the surveillance camera 100, it may be determined that the surveillance camera 100 satisfies the particular condition at step S33.

In this manner, since the surveillance camera 100 performs the object recognizing operation at step S36 only when the state of the surveillance camera 100 satisfies the particular condition, resources of the surveillance camera 100 may be effectively used, and malfunctioning of the surveillance camera 100 may be prevented.

According to an exemplary embodiment, the surveillance camera management device 300 may detect at least one surveillance camera connected to the network 500 and may create mapping data of the newly detected surveillance camera (S34). Here, the "newly detected surveillance camera" may be a surveillance camera of which mapping data thereof is not stored in the surveillance camera management device 300, such as a surveillance camera newly connected to the network 500. Thereafter, the surveillance camera management device 300 may request the newly detected surveillance camera 100 to send a set value or set values of one or more set items thereof.

According to an exemplary embodiment, the user terminal 200 may display a readable object on the display of the user terminal 200 based on the database received from the network design device 400 and a user's input (S35).

In step S33, if the state of the surveillance camera 100 is determined as satisfying the particular condition, the surveillance camera 100 may recognize the readable object included in an image captured by the surveillance camera 100 (S36).

As described above, the "object" may refer to an object having a shape in which a set value or set values for one or more set items of the surveillance camera 100 are included in a visually recognizable form.

In addition, "one or more set items of the surveillance camera 100" may include an item or items determinable by user's setting, such as an address of the surveillance camera 100 in the network 500, an account for establishing connection to the surveillance camera 100 from an external device, a password for establishing connection to the surveillance camera 100 from an external device, and installation information on the surveillance camera 100. In addition, "one or more set items of the surveillance camera 100" may be an item or items that may not be set by a user, such as the model name or MAC address of the surveillance camera 100. It is contemplated that, however, any piece of information about properties of the surveillance camera 100 may become a set item.

Further, the expression "recognizing a readable object included in an image" may be referred as to the controller 130 identifying a recognizable object in an image. For example, when an object is a QR code, the expression "recognizing a readable object included in an image" may refer that the controller 130 identifies the QR code included in the image.

The surveillance camera 100 may read the readable object and update a set value or set values of one or more set items of the surveillance camera 100 (S37). For example, if an object is a QR code and set items of the surveillance camera 100 are an address of the surveillance camera 100 in the network 500 and an account for connecting to the surveillance camera 100 from an external device, the controller 130 may obtain set values such as an address "192.168.10.10" of the surveillance camera 100 in the network 500 and an account "admin" for establishing connection to the surveillance camera 100, and may update a set value or set values of one or more set items. In this manner, since the surveillance camera 100 may photograph an object as described above, a user may rapidly and simply update set values of set items of the surveillance camera 100.

According to an exemplary embodiment, the surveillance camera 100 may receive a request for a set value of at least one set item among a set value or set values of one or more set items from the surveillance camera management device 300 (S38). The surveillance camera 100 may then send the set value of the at least one set item to the surveillance camera management device 300 in response to receiving the request (S39).

For example, the surveillance camera 100 may receive a request from the surveillance camera management device 300 for an address of the surveillance camera 100 in the network 500, an account for establishing connection to the surveillance camera 100 from an external device, a password for establishing connection to the surveillance camera 100 from an external device, and a set value of a set item of the surveillance camera 100. Then, the surveillance camera 100 may send set values of set items corresponding to the request to the surveillance camera management device 300.

The surveillance camera management device 300 may update mapping data of the surveillance camera 100 based on a set value of at least one set item received from the surveillance camera 100 (S40).

Thereafter, the surveillance camera management device 300 may provide installation information on the surveillance camera 100 to a user based on the updated mapping data (S41).

FIGS. 4 to 8 are views illustrating processes of installing a surveillance camera system according to exemplary embodiments.

Figure 4:
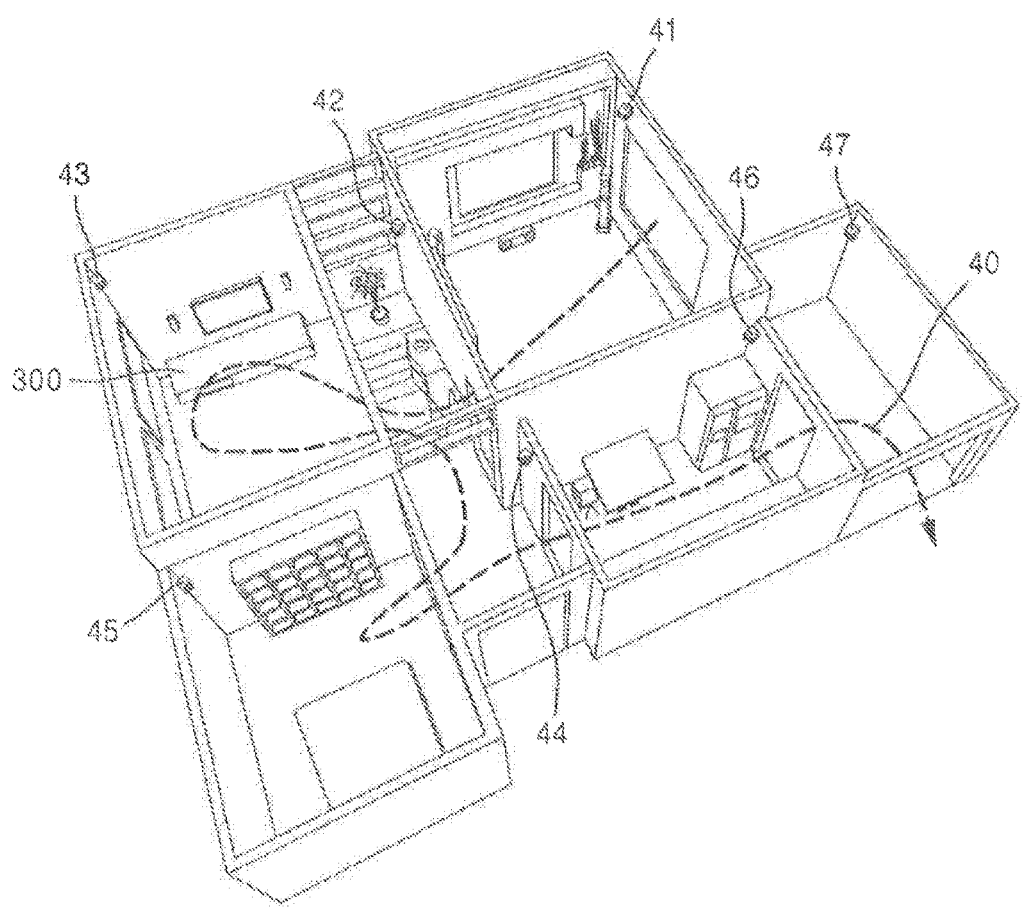
FIG. 4 is a view illustrating a surveillance camera system installed according to an exemplary embodiment.

FIG. 4 is a view illustrating the surveillance camera system installed according to an exemplary embodiment.

In general, a user may install surveillance cameras 41 to 47 in installation regions, respectively. Thereafter, the user may move several times between a surveillance camera management device 300 and each of the surveillance cameras 41 to 47 to perform an operation of recognizing each of the surveillance cameras 41 to 47. The user may then individually set the surveillance cameras 41 to 47, which may prove cumbersome. For example, a first user manipulating the surveillance camera management device 300 and a second user manipulating the surveillance cameras 41 to 47 may have to communicate with each other through a voice communication method, so as to check which surveillance camera is installed at which position.

However, according to an exemplary embodiment, the surveillance cameras 41 to 47 may recognize objects such as QR codes at the same time a user installs the surveillance camera management device 300 and the surveillance cameras 41 to 47. In this manner, installation and setting of the surveillance cameras 41 to 47 may be completed at one time. More particularly, in the case shown in FIG. 4, a user may complete the installation of the surveillance camera system by moving once along a path 40. As described above, according to an exemplary embodiment, the surveillance camera system may be efficiently installed in a precise and rapid manner.

Figure 5:
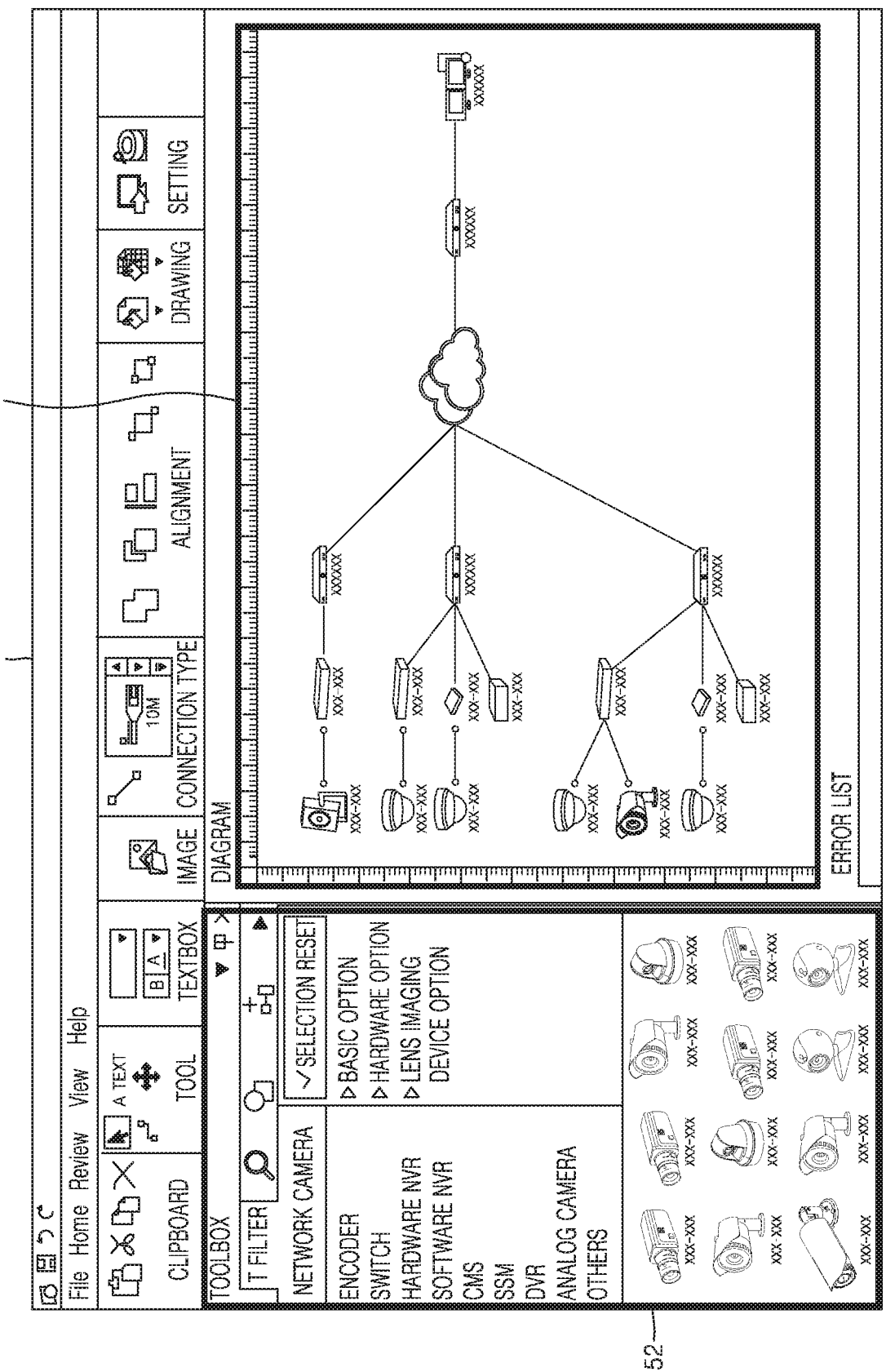
FIG. 5 is a view illustrating a screen for setting network connections using the network design device according to an exemplary embodiment.

FIG. 5 is a view illustrating a screen 50 for setting network connections using a network design device 400 according to an exemplary embodiment.

Referring to FIG. 5, the screen 50 may include a taskpad 51 for network design and a window 52 displaying elements that may be added to the taskpad 51.

A user may virtually configure a system using the network design device 400 before installing a surveillance camera system, so as to check system errors, the number of necessary elements, operational stability, etc.

For example, a user may add elements of a surveillance camera system to the taskpad 51 and may set a connection relationship between the elements. At this time, the user may select elements of the surveillance camera system such as surveillance cameras, check set items of the elements, and input set values for the set items.

The network design device 400 may create a database including a set value for at least one of set items of a surveillance camera based on a surveillance camera system that has been configured via the taskpad 51.

FIG. 6 is a view including a database created by the network design device 400 according to an exemplary embodiment.

Referring to FIG. 6, the database may include a set value for at least one of set items of one or more surveillance cameras.

The database may include a surveillance camera installation information item 61 in addition to an address of at least one surveillance camera in a network, an account for establishing connection to the at least one surveillance camera from an external device, and a password for establishing connection to the at least one surveillance camera from an external device.

The surveillance camera installation information item 61 and the other items may be converted into a visually recognizable form such as a QR code by a user terminal 200, and may then be input into a surveillance camera.

More particularly, a user may virtually configure a system using the network design device 400 and may create a database based on the virtually configured system. In addition, the database created may be transmitted to the user terminal 200, and the user terminal 200 may convert information about each surveillance camera into a visually recognizable form such as a QR code, such that a set value for each set item of the surveillance camera may be input.

Figure 7:
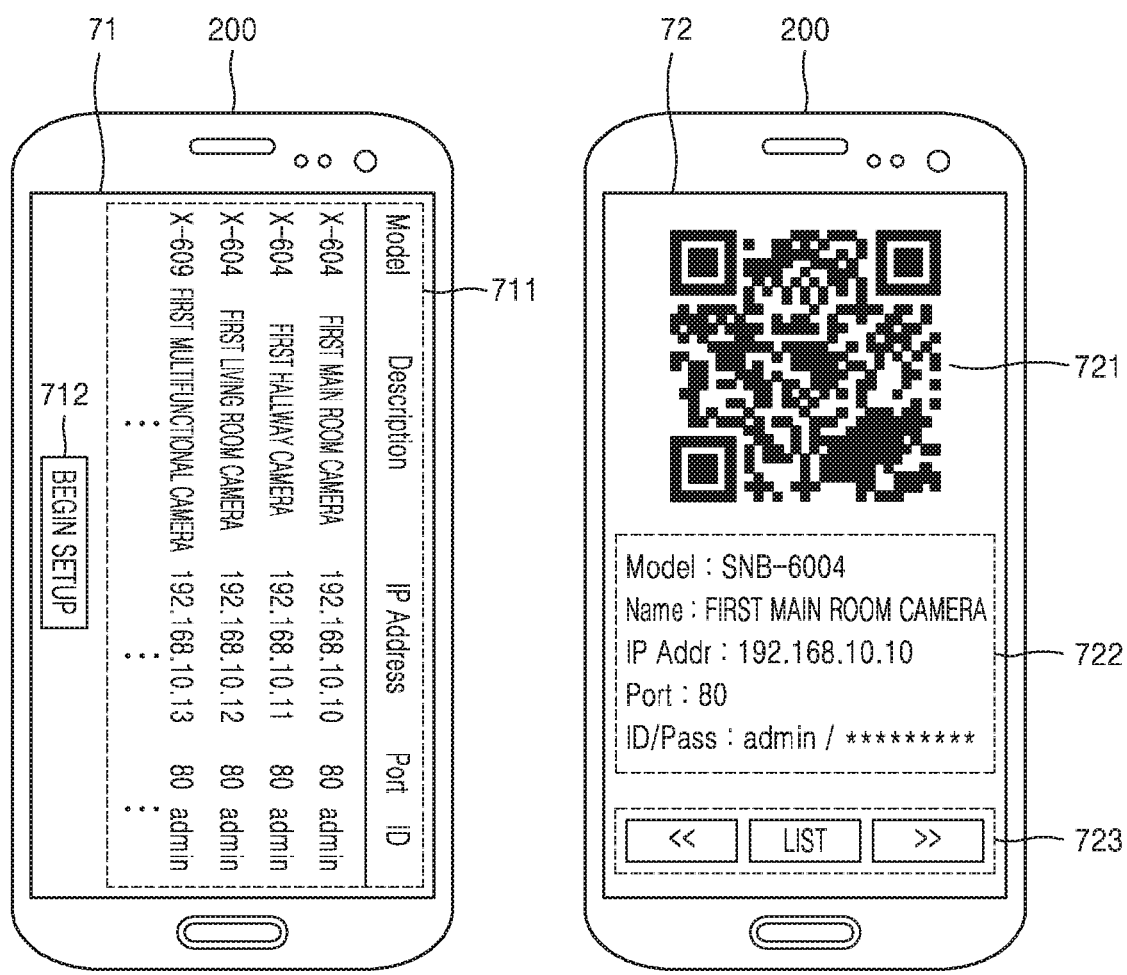
FIG. 7 is a view illustrating screens of a user terminal according to an exemplary embodiment.

FIG. 7 illustrates screens 71 and 72 of the user terminal 200 according to an exemplary embodiment.

Referring to the screen 71, the user terminal 200 may display a database 711 generated by the network design device 400. A user may roughly figure out a system by referring to the database 711 displayed on the screen 71. A user may start system installation by touching a begin setup button 712.

Once the installation starts, the user terminal 200 may display a QR code 721 and a detailed description 722 of the QR code 721 as shown in the screen 72 based on set values of at least one surveillance camera included in the database 711.

After physically installing the surveillance camera that is displayed on the screen 72, a user may immediately complete setting of the surveillance camera by taking a picture of the QR code 721 displayed on the screen 72 by using the surveillance camera. In addition, a user may return to a screen for the previous surveillance camera, or may move on to a screen for the next surveillance camera or a list screen, such as the screen 71, by using a manipulation button 723.

Figure 8:
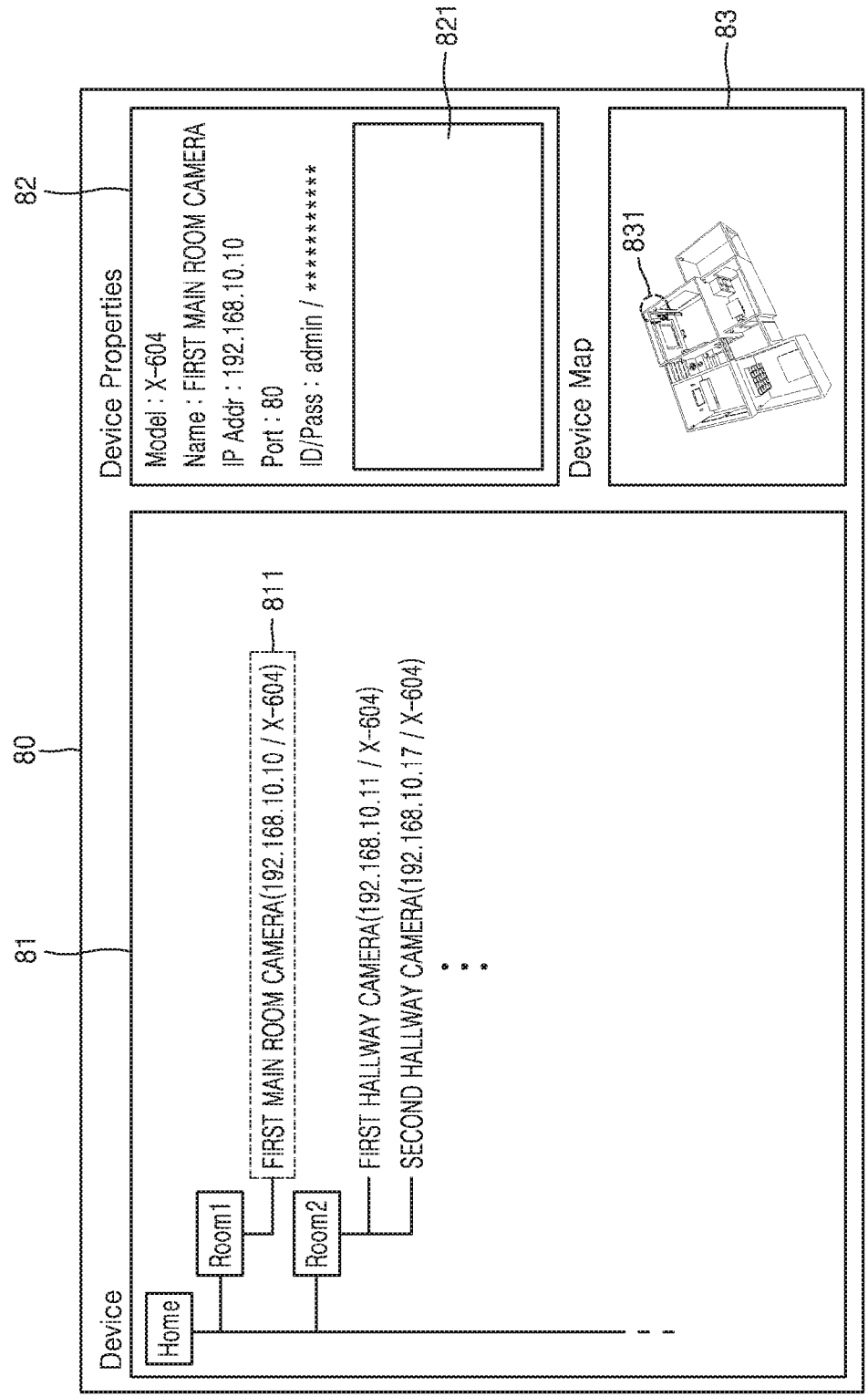
FIG. 8 is a view illustrating a screen of a surveillance camera management device according to an exemplary embodiment.

FIG. 8 is a view illustrating a screen 80 of a surveillance camera management device 300 according to an exemplary embodiment.

Referring to FIG. 8, the screen 80 may include a window 81 displaying surveillance cameras connected to a network, a window 82 displaying detailed information about a selected surveillance camera, and a window 83 showing the location of the selected surveillance camera.

As described with reference to FIG. 7, after a user physically installs a surveillance camera, the user may complete setting of the surveillance camera by taking a picture of a QR code displayed on a screen of the user terminal 200 by using the surveillance camera. In this manner, a user may check installed surveillance cameras using the surveillance camera management device 300 without any additional setting operation.

For example, if a user selects a first main room camera 811 from the screen 81 displaying surveillance cameras, the window 82 of the surveillance camera management device 300 may display detailed information about the first main room camera 811 and real time images 821 captured by the first main room camera 811, and the window 83 may display the location 831 of the first main room camera 811.

The above-described embodiments may be implemented in the form of computer programs executable on a computer using various components, and such computer programs may be stored in non-transitory computer readable media. Examples of the non-transitory computer readable media may include: magnetic media such as hard disks, floppy disks, and magnetic tapes; optical recording media such as CD-ROMs and DVDs; magneto-optical media such as floptical disks; and hardware such as ROMs, RAMs, and flash memories specifically configured to store program instructions and execute the program instructions. Examples of the non-transitory computer readable media may include intangible media that may be transferred over network. For example, the non-transitory computer readable media may be implemented in the form of software or applications that may also be transferred and distributed over network.

In addition, the computer programs may be those designed and configured according to the embodiments or well known in the computer software industry. Examples of the computer programs may include machine codes made by compilers and high-level language codes executable on computers using interpreters.

In addition, the above-described operations or embodiments are examples which are not intended to limit the scope and spirit of the inventive concept. In the present disclosure, descriptions of known electric components, control systems, software, and other functional aspects thereof may not given for conciseness. Furthermore, in the drawings, connection lines or members between elements are exemplary functional, physical, and/or electric connections that may be replaced with or used together with other functional, physical, and/or electrical connections. Elements described without using terms such as "essential" and "important" may not be necessary for constituting the inventive concept.

That is, the scope of the inventive concept is not limited to the embodiments but should be defined by the appended claims and equivalents thereof.

As described above, one or more exemplary embodiments may provide a surveillance camera setting method and a surveillance camera system that may provide setting of surveillance cameras at the same time as the surveillance cameras are installed.

In addition, one or more exemplary embodiments may provide a surveillance camera configured to update a set value or set values of one or more set items by reading an object included in an image and configured to transmit the set value or set values in response to a set value transmission request from an external device.

Further, one or more exemplary embodiments may provide a user terminal that may display an object for setting a surveillance camera by receiving a database from a network design device.

Furthermore, one or more exemplary embodiments may provide a surveillance camera management device configured to send a request for a set value or set values to a surveillance camera and update mapping data of the surveillance camera by receiving the set value or set values from the surveillance camera.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. The method of controlling an installation of a surveillance camera, the method comprising:
   updating, by the surveillance camera, a set value of one or more set items of the surveillance camera by reading a readable object in a captured image;
   displaying, by a user terminal, the readable object on a display based on at least one of user's input and a surveillance camera database;
   receiving, by the user terminal, the surveillance camera database, which has been created and transmitted to the user terminal;
   detecting, by a surveillance camera management device, the surveillance camera connected to a network;
   generating, by the surveillance camera management device, mapping data of the detected surveillance camera;
   sending, by the surveillance camera management device, a request for the set value of one or more set items of the detected surveillance camera to the detected surveillance camera;
   receiving, by the surveillance camera management device, the set value from the detected surveillance camera; and
   updating, by the surveillance camera management device, the mapping data of the detected surveillance camera based on the received set value.

2. The method of claim 1, wherein the one or more set items comprise at least one of:
   an address of the detected surveillance camera in the network;
   an account for establishing connection to the detected surveillance camera;
   a password for establishing connection to the detected surveillance camera; and
   installation information on the detected surveillance camera, wherein the installation information on the detected surveillance camera is configured to be provided to a user based on the updated mapping data.

3. A surveillance camera system, comprising:
   at least one surveillance camera configured to:
      update a set value of one or more set items of the surveillance camera by reading a readable object in a captured image; and
      transmit the set value of the one or more set items to a surveillance camera management device in response to receiving a request for the set value from the surveillance camera management device;
   a user terminal configured to display the readable object on a display based on at least one of user's input and a surveillance camera database;
   the user terminal receiving the surveillance camera database, which has been created and transmitted to the user terminal; and
   the surveillance camera management device configured to:
      send the request for the set value of the one or more set items to the at least one surveillance camera; and
      update mapping data of the at least one surveillance camera by receiving the specifically requested set value from the at least one surveillance camera, wherein the surveillance camera decodes the readable object in order to update the set value of one or more set items of the surveillance camera.

4. The surveillance camera system of claim 3, wherein the set value of the readable object is in a visually recognizable form.

5. The surveillance camera system of claim 4, wherein the one or more set items comprise at least one of:
   an address of the surveillance camera in a network;
   an account for establishing connection to the surveillance camera from the surveillance camera management device;
   a password for establishing connection to the surveillance camera from the surveillance camera management device; and
   installation information on the surveillance camera.

6. The surveillance camera system of claim 5, wherein the installation information comprises global positioning system (GPS) information with respect to a location of the at least one surveillance camera.

7. The surveillance camera system of claim 4, wherein the readable object comprises a quick response (QR) code.

8. The surveillance camera system of claim 4, wherein:
   the at least one surveillance camera is configured to determine whether the at least one surveillance camera satisfies a first condition; and
   the at least one surveillance camera is configured to recognize and read the readable object when the first condition is satisfied.

9. The surveillance camera system of claim 8, wherein the first condition is whether a time period from which the at least one surveillance camera is powered on is within a first time range.

10. The surveillance camera system of claim 8, wherein the first condition is whether the set value of the one or more set items is initialized.

11. The surveillance camera system of claim 3, further comprising a network design device configured to:
    set a connection relationship between the at least one surveillance camera and a network; and
    set a value of an at least one set item of the at least one surveillance camera according to a user's input.

12. The surveillance camera system of claim 11, wherein the network design device is configured to generate, in the network design device, the surveillance camera database comprising the set value of the at least one set item of the at least one surveillance camera.

13. The surveillance camera system of claim 12, wherein the user terminal is configured to generate the readable object on the display based on the surveillance camera database in the network design device.

14. A surveillance camera system, comprising:
at least one surveillance camera configured to:
- update a set value of one or more set items of the surveillance camera by reading a readable object in a captured image; and
- transmit the set value of the one or more set items to a surveillance camera management device in response to receiving a request for the set value from the surveillance camera management device;

a user terminal configured to display the readable object on a display based on at least one of user's input to the user terminal;

the user terminal receiving a surveillance camera database, which has been created and transmitted to the user terminal; and the surveillance camera management device configured to:
- send the request for the set value of the one or more set items to the at least one surveillance camera; and
- update mapping data of the at least one surveillance camera by receiving the specifically requested set value from the at least one surveillance camera, wherein the surveillance camera decodes the readable object in order to update the set value of one or more set items of the surveillance camera.

* * * * *